United States Patent [19]
Advani

[11] Patent Number: 5,975,907
[45] Date of Patent: Nov. 2, 1999

[54] MOTION SIMULATOR WITH MOVABLE BASE PLATE

[75] Inventor: Sunjoo Kan Advani, Breda, Netherlands

[73] Assignee: Technische Universiteit Delft, Netherlands

[21] Appl. No.: 09/056,199

[22] Filed: Apr. 6, 1998

[51] Int. Cl.[6] .............................. G09B 9/02; A63G 31/16
[52] U.S. Cl. .............................................. 434/29; 472/130
[58] Field of Search ................................. 434/29, 30, 38, 434/45, 55, 62, 69; 472/59, 60, 130

[56] References Cited

U.S. PATENT DOCUMENTS

| | | |
|---|---|---|
| 3,577,659 | 5/1971 | Kail . |
| 3,619,911 | 11/1971 | Pancoe ........................................ 434/58 |
| 3,645,011 | 2/1972 | Callanen ..................................... 434/58 |
| 4,280,285 | 7/1981 | Haas ........................................... 434/30 |
| 4,564,356 | 1/1986 | Winfree ...................................... 434/29 |
| 4,576,577 | 3/1986 | Lam et al. .................................. 434/58 |
| 4,753,596 | 6/1988 | Hart et al. .................................. 434/29 |
| 4,978,299 | 12/1990 | Denne ................................. 250/231.14 |
| 5,009,412 | 4/1991 | Roodenburg et al. ...................... 472/59 |
| 5,018,973 | 5/1991 | Alet et al. .................................. 434/62 |
| 5,388,991 | 2/1995 | Morris ........................................ 434/55 |
| 5,433,608 | 7/1995 | Murray ....................................... 434/29 |
| 5,453,011 | 9/1995 | Feuer et al. ................................ 434/38 |
| 5,490,784 | 2/1996 | Carmein ..................................... 434/55 |
| 5,511,979 | 4/1996 | Perfect et al. ............................. 434/58 |
| 5,545,040 | 8/1996 | Lu ............................................... 434/58 |
| 5,564,985 | 10/1996 | Engstrand .................................. 472/60 |
| 5,597,359 | 1/1997 | Byerly ........................................ 472/60 |
| 5,605,462 | 2/1997 | Denne ........................................ 434/58 |
| 5,623,878 | 4/1997 | Baxter et al. .............................. 104/85 |
| 5,662,523 | 9/1997 | Yasumaru et al. ......................... 463/30 |
| 5,752,834 | 5/1998 | Ling ........................................... 434/58 |
| 5,829,982 | 11/1998 | Advani et al. ............................. 434/58 |

FOREIGN PATENT DOCUMENTS

| | | | |
|---|---|---|---|
| 406-729 | 1/1991 | European Pat. Off. ................. 434/61 |
| 3-33889 | 2/1991 | Japan ........................................ 434/62 |
| 3-274587 | 12/1991 | Japan ........................................ 434/62 |

*Primary Examiner*—Paul J. Hirsch
*Assistant Examiner*—Michael B. Priddy
*Attorney, Agent, or Firm*—Michaelson & Wallace; Peter L. Michaelson

[57] ABSTRACT

A motion simulator comprises a deck supported by a number of length-adjustable legs. The legs are connected to a baseplate which is, in turn, supported by a number of swivel arms which support the baseplate relative to a ground plate. The configuration of legs and swivel arms allows the deck five degree of freedom relative to the baseplate.

15 Claims, 4 Drawing Sheets

, 907

MOTION SIMULATOR WITH MOVABLE BASE PLATE

BACKGROUND OF THE INVENTION

This invention relates to a motion simulator and is more particularly concerned with improvements in motion simulators comprising a deck supported by a number of length adjustable legs.

For simulating motions, in particular vehicle motion such as for instance of aircraft, boats, trains and automobiles, motion simulators are used comprising a deck that is arranged on a number of movable legs. The deck can be moved within a motion envelope through a change of the lengths of the legs. Such motion simulator is known as a Stewart Platform and is discussed in Stewart, D., A Platform with six-degrees-of-freedom", in Proc.Inst. of Mechanical Engineers, Vol. 180, Part 1, No. 5, 1965–1966, pp. 371–386, herein incorporated by reference.

The deck of this known motion simulator is a flat plate stiffened by means of a load-bearing beam construction. Via the beam construction, the legs are attached to the bottom side of the plate by means of first pivot points, while on the top side of the deck a simulation environment is built up. In this manner, during the motions of the deck the legs are prevented from being obstructed by any element of the part of the simulator supported by the legs. The simulation environment comprises for instance a cockpit of an aircraft or other vehicle reproduced on the deck, while outside the reproduced cockpit, on the deck, means are provided for presenting a simulated environment. Furthermore, inter alia an instructors cabin, control and information means and conditioning means for the atmosphere in the simulator, as well as a casing which surrounds the part of the simulator that is supported by the legs can be positioned on the deck.

Since the deck is a flat, beam-stiffened plate construction, the advantage is achieved that the deck is relatively inexpensive, whereas almost any simulation environment can be reproduced. However, this known simulator has the drawback that the deck with the simulation environment built thereon may be heavy and has specific stiffnesses only to a limited extent. An increase of the stiffnesses results in an even higher mass of the construction, Since the moving part of the simulator is heavy, a high load-bearing capacity of at least the legs is necessary. Consequently the response time of the simulator, that is the delay time between the provision of a control signal and the reaction of the simulator thereto becomes unacceptably high, the more so since the high weight of the simulator represents a great inertia. These high response times, which are typically at 100 milliseconds and more, cause the simulated behaviour of the vehicle to becomes unnatural, in particular in the case of simulation of vehicles that in reality have very short response time, such as for instance vehicles on wheels, aircrafts and the like. This response time lag results in a less effective simulation. Moreover, the operator can be adversely influenced, for instance through the occurrence of motion sickness. In principle, these high response times can at least partly be compensated through anticipation, but this is only possible for vehicle and environment characteristic input signals, not for signals inputted by the operator. Moreover, this is complicated from the view point of control engineering and hence costly. A high weight of the moving part of the simulator further has an adverse effect on the natural frequency and damping of the motion simulator and on the influence of interference signals, and, moreover, the part can be accelerated only to a limited extent.

A further drawback of a motion simulator of the known type is that it is not optimized for the simulation of the desired vehicle or working environment. The envelope of movement of the deck differs strongly from the necessary space for accurately simulating the specific movements of the vehicle or working environment. This results in acceleration and deceleration of considerably more mass than necessary, whereas a relatively large space is necessary for such motion simulator. Furthermore, this known motion simulator has the disadvantage that in at least a number of directions of movement undesired limits of movement will be reached for at least a number of the supporting legs, constituting singularities and resulting in difficult, it not impossible control of the movements of the deck and a negative influence on the accuracy, of the simulation. There above, the distribution of forces to and by the legs is not optimal, disadvantageously influencing the construction and the possible accelerations and decelerations of the leg supported part and the forces necessary thereto.

SUMMARY OF THE INVENTION

Hence, one object of the invention is to provide for a motion simulator of the type described in the opening paragraph, wherein the above-mentioned drawbacks are avoided, while the advantages thereof are maintained. To this end, a motion simulator according to the present invention comprises a deck supported by a number of length adjustable legs connected with said deck in first pivot points, said legs being connected with a base plate in second pivot points, wherein the base plate is movably connected with a ground plate.

Such a motion simulator has a relatively small building volume compared with the building-in space and the possibilities of motion, while the moving part of the simulator carried by the base plate can be compact and light. Building-in space is to be understood as the minimum space necessary for the simulator to be able to reach all extreme positions without collision. This enables high accelerations and profitable motion forces at short response times by means of control and drive means of a relatively light construction, while, moreover, the control can be realized with relatively simple means. In particular, due to the low weight of the moving part of the simulator the peripheral equipment used to the simulator can be of a light and hence relatively cheap and energy-friendly design. Moreover, the simulator can be operated in a relatively limited space, without requiring any specific supporting measures.

During use, part of the movement of the deck can be obtained by movement of the base plate relative to the ground plate, whereas further movement of the deck can be obtained by movement of the deck relative to the base plate. By movement of the base plate relative to the ground plate especially low frequency movements necessary in simulating a specific vehicle or working environment can be realized. In doing so further movements of the deck, necessary for the simulation of the specific vehicle or working environment can then be obtained by limited motions of the deck relative to the base plate, which makes it possible to use legs with a relatively short length and small length-adjustability, which legs can be relatively light and can have a very short response time. Thus, advantageously high accelerations and decelerations can be obtained without excessive forces. There above, the relatively short legs make it easier to position the motion simulator in a relatively narrow space without the danger of collision. Furthermore, since a motion simulator according to the present invention is relatively small and light it can for instance be disposed on a normal storey floor and can, if desired, be of a portable design. Furthermore, legs having a relatively short adjustability are relatively inexpensive to purchase, maintain and operate, which renders a very economical motion simulator.

In an advantageous embodiment, in a motion simulator according to the present invention, the base plate is supported by a number of swivelling arms connected with said base plate in third pivot points, said swivelling arms being connected with the ground plate in a number of fourth pivot points. Preferably, the base plate is connected with the ground plate in such a manner that the base plate during use has a virtual center of motion located near, preferably inside a simulator part formed or supported by the deck.

By use of the swivelling arms, pivotable in third and fourth pivot points, a rocking motion of the base plate relative to the ground plate can be obtained, for movement of the leg-supported deck in a rocking manner by relatively simple constructional and functional means. Moreover, the swivelling arms define the path of travel, that is the movements of the base plate relative to the ground plate in a uniform manner. The virtual center of motion is advantageously positioned near, and preferably inside, a simulator part formed or supported by the deck, most preferably at the nominal location of the head of a person using the simulator, for example a driver or pilot. This has the advantage that the motions experienced by said person are, or at least seem to be, even more natural and furthermore provides for an advantageous distribution of forces acting on the simulator parts, mainly due to the position of the center of gravity of the moving part of the simulator relative to said virtual center of movement.

In this description said virtual center of movement must be understood as a momentary center of movement given the momentary position of the base plate relative to the ground plate and the deck relative to the base plate. The position of the virtual center of movement near, preferably inside a simulator part formed or supported by the deck should preferably at least be present when the moving part of the simulator is in a central, neutral position relative to the ground plate, whereby the legs have a length midway between their minimum and maximum length, the actuators being in mid-stroke.

In a further preferred embodiment in a motion simulator according to the present invention the base plate is movably connected with the ground plate by a number of swivelling arms, the length of at least one of the swivelling arms being different from the length of at least one of the other swivelling arms, measured between the relevant third and fourth pivot points. Preferably pairs of swivelling arms are provided, the length of the swivelling arms of a first pair being greater than the length of the swivelling arms of at least one other pair.

Due to the difference in length of the swivelling arms the base plate will, during use, make a tilting movement as well as a rocking movement relative to the base plate. Such tilting movement is especially advantageous for simulating for example pitch, roll or yaw when simulating an aircraft or other similar vehicle, By choosing suitable lengths for the swivelling arms the virtual center of movement of the base plate can be conveniently set, whereby the translating movements of the deck due to the rocking and/or tilting movement of the base plate are kept within relatively small limits, which is convenient in order to minimize the space necessary for operation of the motion simulator.

In a further elaboration a motion simulator according to the present invention comprises at least two pairs of swivelling arms, wherein the third pivot points of a first and second pair of swivelling arms respectfully define a primary and secondary first swivel axis, which first swivel axes are substantially parallel to each other, while the fourth pivot points of the first and second pair of swivelling arms respectfully define a primary and a secondary second swivel axis, which second swivel axes are substantially parallel to the first swivel axes.

Due to the definition of the first and second swivel axis, the degree of freedom of the base plate relative to the ground plate is limited to a rocking and/or tilting movement in one direction, that is in a plane perpendicular to the first and second swivel axis. In using such motion simulator, the envelope defined by the outer limits of movement of the deck relative to the ground plate will be approximately hyper-ellipsoid, the longer axis thereof positioned in said plane perpendicular to said first and second swivel axis. Since in most vehicle simulations, such as air planes or motor cars simulations, larger movements will be necessary in one main direction, simulating motions in mainly forward and/or backward direction, the movements in vertical direction, sideways and rotations other than in said plane perpendicular to the first and second swivel axis being limited, this is especially advantageous. The movements of the deck to be obtained by adjusting the length of the legs can then be minimized, thus minimizing the necessary length of the legs and the adjustability thereof and/or their nominal positions. As discussed before, this means that the necessary equipment and the forces acting on the legs and the like can be kept at a minimum as well, having the aforementioned advantages. Furthermore, with such simulator even better simulation of vehicle characteristics can be obtained, whereas even higher accelerations and decelerations will be possible.

In a preferred embodiment part of the leg supported deck extends between the legs, such that the legs are substantially free from the deck, even in any extreme position. This has the advantage that the center of gravity of the part of the simulator supported by the legs can lay relatively low, for example near a plane defined by at least three of the first pivot points, thus even further reducing forces acting upon the legs and minimizing the influence of the momentum of inertia of the leg supported part. Thus even higher accelerations and decelerations and more extreme positions may be possible without requiring stronger and/or longer legs.

In a relatively simple embodiment, such as a Stewart Platform-type simulator built on the base plate, the legs can be identical, the first swivel points being positioned in a first plane and the second pivot points positioned in a second plane, parallel to the first plane, the Stewart Platform being symmetrical relative to at least three vertical planes. However, in order to further optimize the proportions and possibilities of a motion simulator in accurately simulating vehicle movements, it is preferred that at least the part of the motion simulator carried on the base plate is further optimized by selecting legs having different minimum and maximum lengths and/or positioning of the first and/or second pivot points in optimal positions, for example in pairs in different planes or spaced apart from each other. Such further optimized motion simulators are disclosed in for example WO 96/04636 and NL 10.06741, which publications are incorporated herein by reference.

The fourth pivot points can, seen in side view, be located in a plane above the third pivot points, such that the base plate hangs on the swivelling arms. This has the advantage that the base plate will be forced into a neutral position due to gravity, whereby initiation of movement of the base plate can relatively easy be obtained by small forces. Especially when the base plate is being used for the provision of low frequency movements, such as pitch in aircraft-simulation, the actuating means necessary for movement of the base plate relative to the ground plate can be robust and easy of construction. Simulation signals necessary for said pitch can be diverted directly to said actuating means.

In a further embodiment, a motion simulator according to the invention comprises three swivelling arms, defining parallel first and second swivel axes, whereby one swivelling arm is located between at least two second pivot points.

In such embodiment a stable simulator can be obtained, having a relatively small base- and ground plate. Furthermore, the second swivel axes can be positioned close to each other, as can the first swivel axes. Therefore, relatively large movements of the base plate can be obtained with relatively short arms and/or small movements of said arms.

Further advantageous embodiments are described in the claims. A motion simulator according to the present invention will be further elucidated in the following description, in which preferred embodiments will be described.

DETAILED DESCRIPTION

Figure 1:
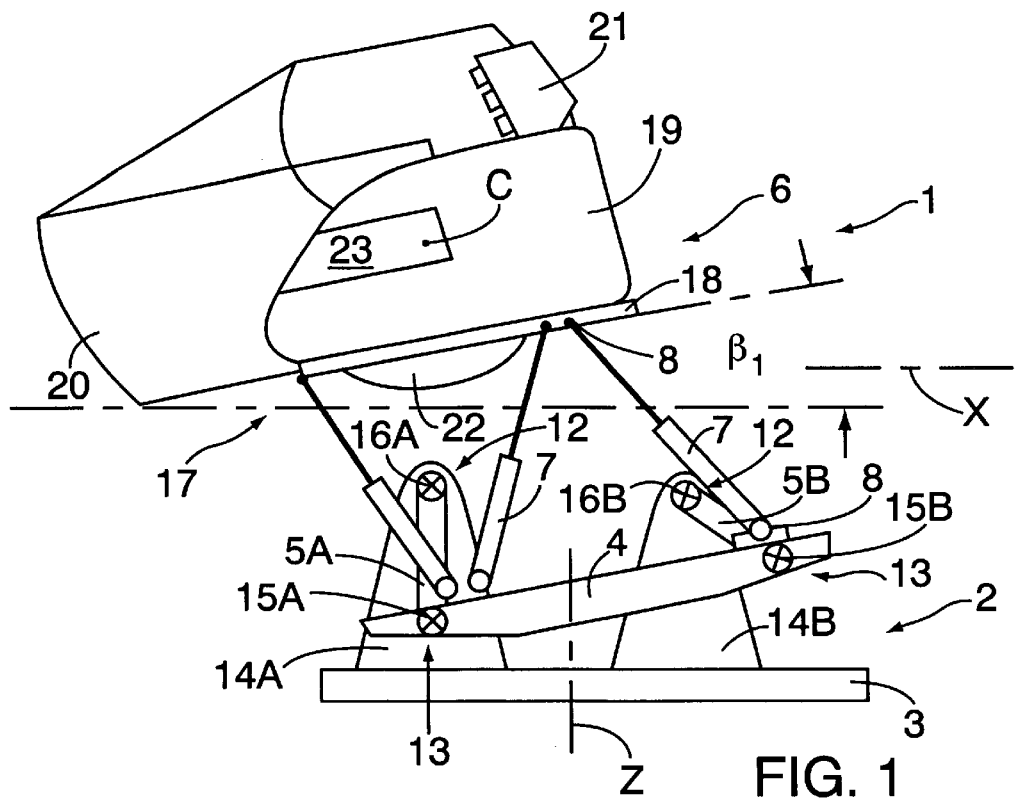
FIG. 1 is a schematical side view of a motion simulator according to the present invention, in a first embodiment, in a first position.
Figure 2:
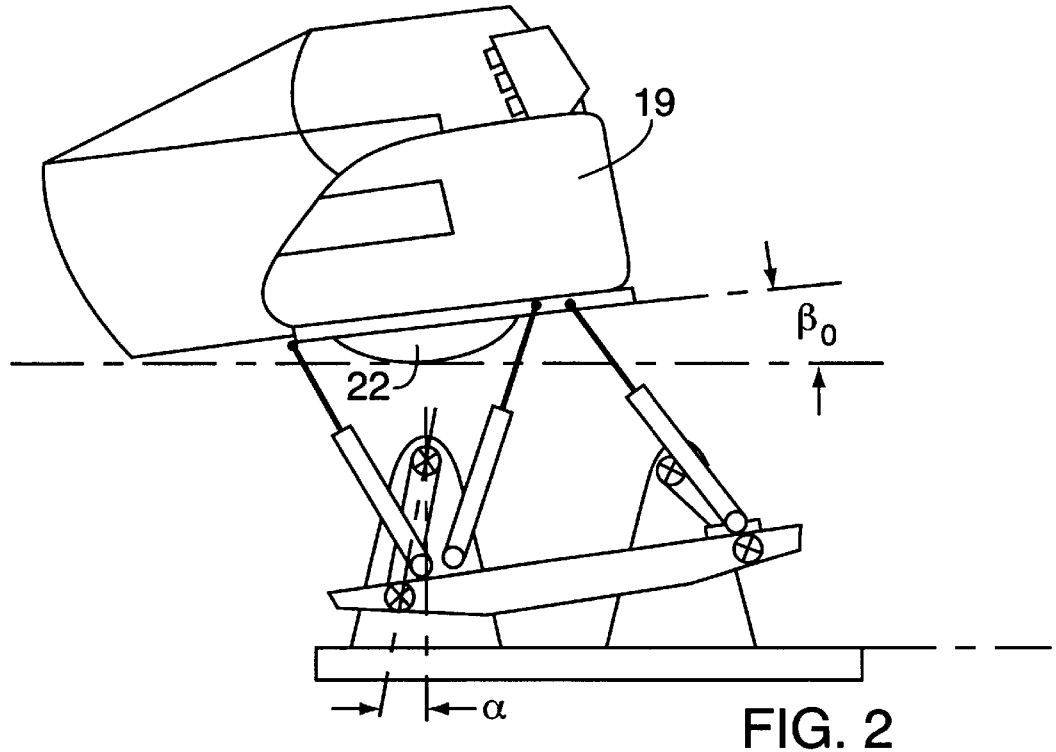
FIG. 2 is a schematical side view of the motion simulator according to FIG. 1, in a second position.

FIGS. 1 and 2 show in side view, schematically a motion simulator 1 according to the invention, with a base part 2, comprising a ground plate 3 and a base plate 4, connected to the ground plate by swivel arms 5. On the base plate 4, a simulator part, further to be referred to as deck 6, is carried by six legs 7. The legs 7 are length-adjustable between a minimal and a maximal length. The legs 7 are connected to the deck 6 in first pivot points 8 and to the base plate 4, in second pivot points 9, such that the deck 6 has six degrees of freedom relative to the base plate 4. The extreme positions of the deck relative to the base plate 4 are thus defined by said minimal and maximal leg lengths, that is the stroke, and the relative position of the first 8 and second pivot points 9 relative to each other, are preferably optimized as discussed in WO 96/04636 and/or NL 10.06741, incorporated herein by reference. The simulator part carried by the base plate 4 can also be a different simulator, for example a Stewart Platform.

The base part 2 comprises a first pair 10 of swivel arms SA and a second pair 11 of swivel arms 5B. The swivel arms 5 are connected to the base plate 4 in third pivot points 12 and to the ground plate 3 in fourth pivot points 13. To this end, the ground plate 3 comprises columns 14, on two sides of the ground plate 3, the fourth pivot points 13 located near the top end 23 of the columns 14, For a better understanding, in this description an x-axis is defined lying in the plane of the drawing, parallel to the plane of the ground plate 3. A z-axis is defined lying in the plane of the drawing, perpendicular to the x-axis, whereas an y-axis is defined perpendicular to both the x- and the z-axis. The x-axis is substantially parallel to the main direction of movement.

Through the third pivot points 12 of the first pair 10 of swivel arms 5A a primary first swivel axis 15A is defined, a secondary first swivel axis 15B defined by the third pivot points 12 of the second pair 11 of swivel arms 5B. A primary second swivel axis 16A and a secondary second swivel axis 165 are defined by the fourth pivot points 13 of the first pair 10 and second pair 11 of swivel arms 5A, 5B respectively. The first 15 and second 16 swivel axes are substantially parallel to each other and to the y-axis, The primary swivel axes 15A, 16A are positioned near the front 17 of the deck 6, the secondary swivel axes 15B, 16B near the rear is thereof. The distance between the primary and secondary first swivel axes 15A, 15B is larger than the distance between the primary and secondary second swivel axes 16A, 16B, measured in the direction of the x-axis. Thus the first pair 10 swivel arms 5A is inclined upward in the direction of the second pair 11 of swivel arms 5B, such that the swivel arms 5A, 5B have a momentary virtual center of motion C, for example a rocking axis, positioned above the third 12 and fourth pivot points 13. Said center of motion C will be further discussed later.

The front columns 14A are higher than the rear columns 14B, the front swivel arms 5A being longer then the back swivel arms 5B. During use the swivel arms 5A, 5B will rotate around the primary 16A and secondary second swivel axis 16B respectively, thus moving the base plate 4 in a rocking motion back or forth, in the direction of the x-axis, thereby moving the base plate 4 up or down as well, along the z-axis. Due to the difference in length between the first pair 10 and second pair 11 swivel arms 5A, 5B this rocking movement will also initiate a tilting movement of the base plate 4 around a momentary axis parallel to the y-axis. Said momentary axis is preferably located near the center of motion C.

In FIG. 1 the base plate 3 is positioned in a first position, in FIG. 2 the base plate 3 is in a second position. By moving the front swivel arms 5A over an angle α a tilting movement of the deck is achieved over an angle $\beta_1-\beta_0$, whereas no or only a relatively small translating movement of the deck 6 in the direction of the x-axis is obtained. In FIGS. 1 and 2, the position of the deck 6 relative to the base plate 4 is identical.

The deck 6 is surrounded by or even part of a shell-like casing 19, constituting a surrounding in which an environment to be simulated can be constituted, such as a cockpit of an air plane or the like. At least one seat or other operating position will be provided for seating an operator, such as a pilot. The virtual center of motion C is preferably located near the nominal position of the head of the operator. Herewith, highly accurate simulations of (vehicle) movements can be obtained without redundant or spurious movements. Any spurious movements can moreover easily be compensated.

Surrounding the operator, at least partly, is a viewing screen 20, on which a simulated environment can be projected by projectors 21, which screen 20 and projectors 21 will move along with the deck 6. The screen can be seen through a adjustable window 23.

In operation of a motion simulator 1 according to the invention, the relatively low-frequency pitch-movements can be decoupled from the other five degrees-of-freedom of the deck 6. In accurate simulation of vehicle movements normally the largest movement will in general be in an x-z-plane, especially pitch. By decoupling said pitch at least largely from the other movements, by providing for said pitch through movement of the base plate, the stroke of each of the legs 7 can be kept relatively small and thus the building volume of such motion simulator can be small compared to a motion simulator of the known type having a similar envelope of movement. Such shorter legs 7 make faster response times (close to zero seconds) and more accurate positioning possible. Higher accelerations and decelerations will be possible, whereas smaller forces will act on the legs, thus making a lighter construction possible, even further improving the aforementioned features.

Figure 3:
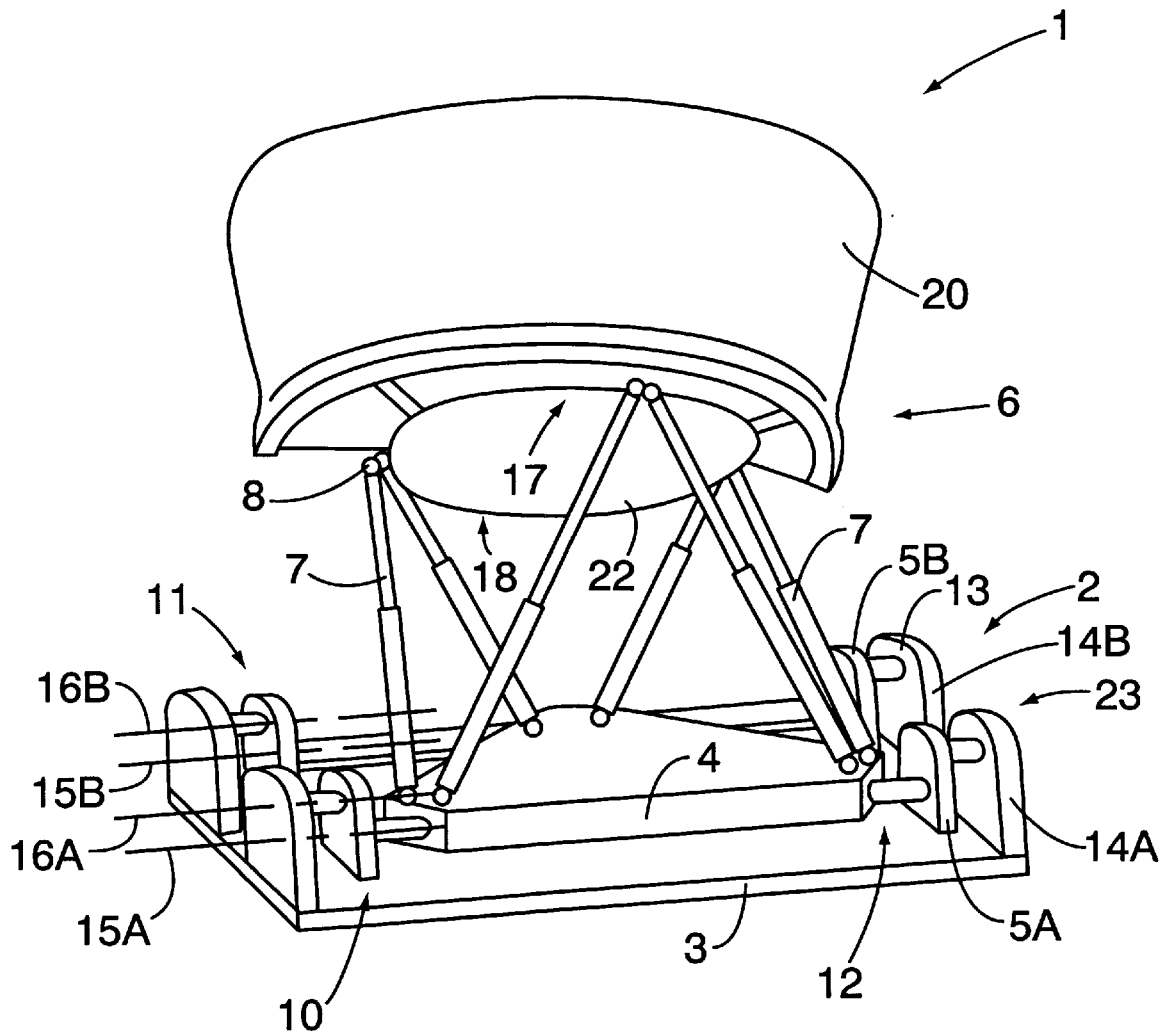
FIG. 3 is a perspective view of a motion simulator according to the present invention.
Figure 4:
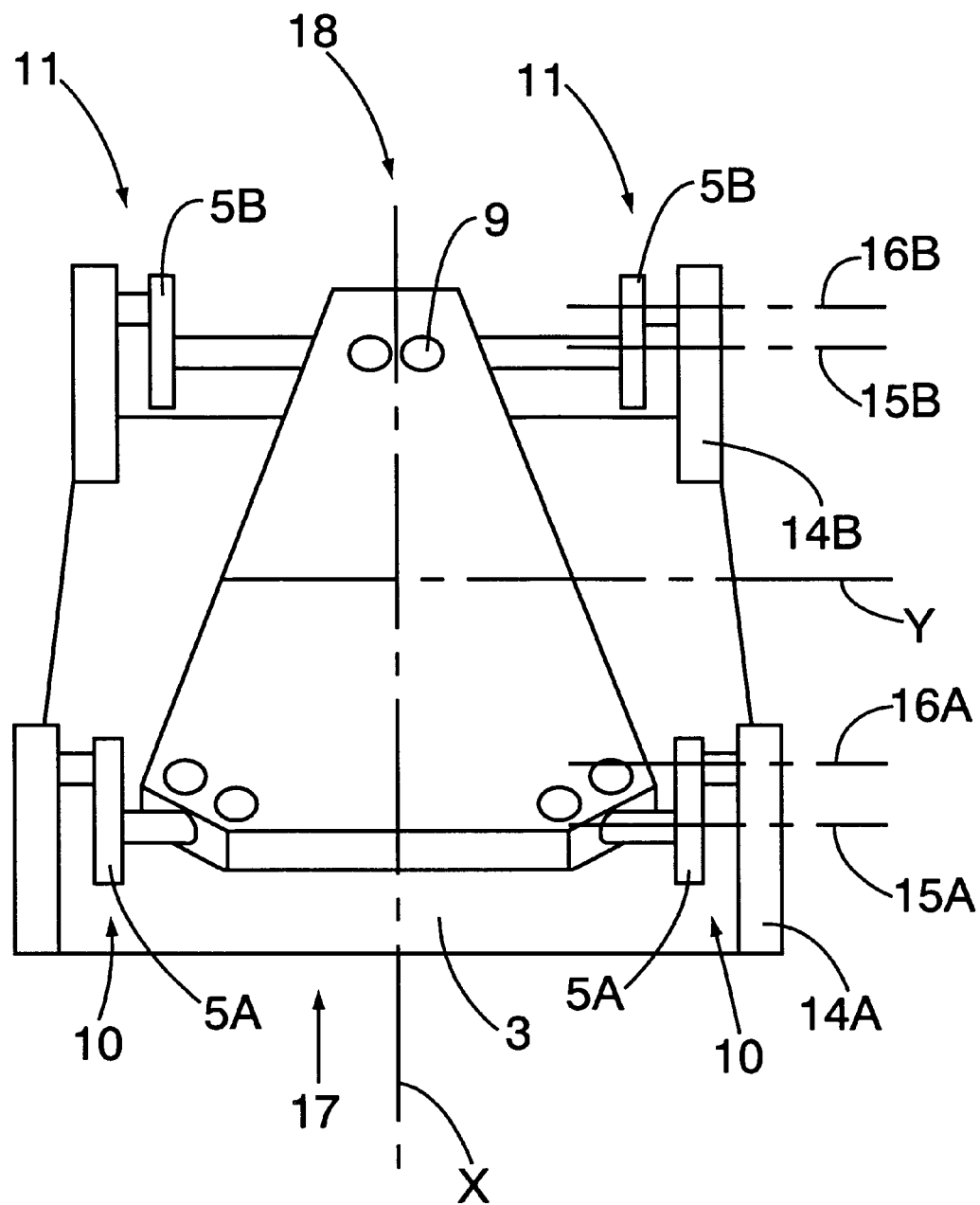
FIG. 4 is a plan view of a motion simulator according to the present invention, the legs and leg supported part of the motion simulator being taken away.

FIG. 3 shows a first embodiment of a simulator 1 in perspective view. FIG. 4 shows a plan view of a base part 2 of the simulator according to FIG. 3. As is clear from FIG. 3, part of the simulator supported by the legs 7 extends between the legs 7. To this end the shell or casing 19 has a lower part 22 designated to be just free of the legs 7 in each of the extreme or intermediate positions. This enables a low center of gravity of said leg supported part, which center of gravity preferably lies in a plane defined by three or more first pivot points 8.

Figure 5:
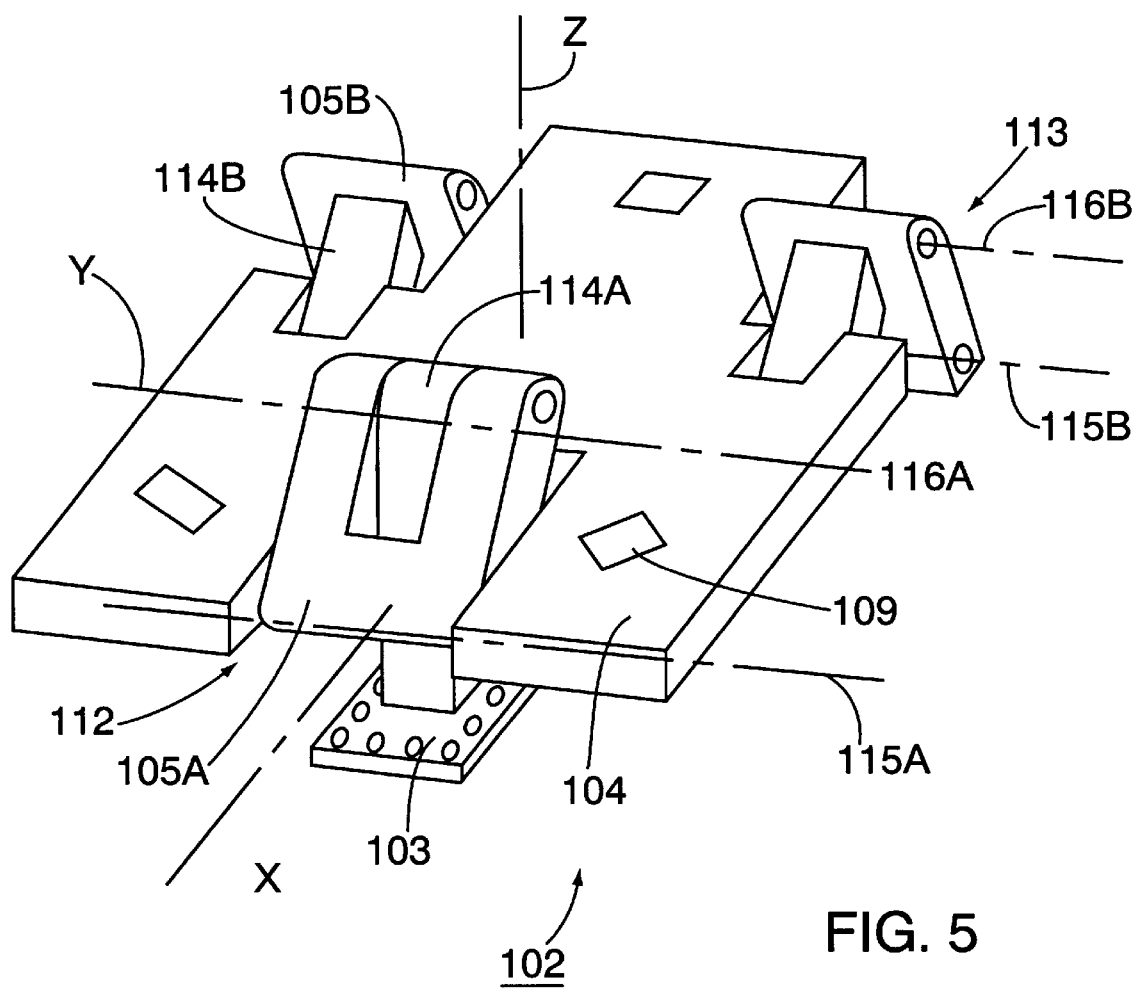
FIG. 5 is a perspective view of a base part of a motion simulator according to the invention, in a further embodiment, the part of the simulator supported by the base plate taken away.

FIG. 5 shows an alternative embodiment of a base part 102 for a motion simulator 101 according to the present invention. In this embodiment the base part 102 comprises a ground plate 103 and a base plate 104, connected to the ground plate 103 by three swivel arms 105. Two of the swivel arms 105B are connected to the rear of the base plate 104 through third pivot points 112, whereas the third swivel arm 105A is connected to the base plate near the front thereof by third pivot point 112. The swivel arms 105A, B are connected to columns 114A, 114B respectively, such that the columns 114 are mainly positioned between the swivel arms 105. The fourth swivel point 116A of the front swivel arm 105A is positioned between two front ward positioned second pivot points 109 of the legs 107 (not shown). This embodiment has the advantage that it has a relatively small building volume, due to the relatively small distance between the primary and secondary first 115 and second 116 swivel axis. Once again, by the use of swivel arms 105A, 105B of different lengths a combination of a rocking and tilting movement can be obtained of the base plate 104 relative to the ground plate 103. The invention is by no means limited to the embodiments as shown in the description. Many alternative embodiments are possible within the scope of the claims. For example the base plate can be movably connected to the ground plate by rail guided means, including tracks and rollers. Furthermore, the swivel arms can be mounted in bi- or omnidirectional suspension elements, for example comparable to the pivot points of the legs, such that the base plate can move in two or more directions relative to the ground plate. This will enable a similar or different kind of motion simulation.

I claim:

1. A motion simulator comprising a deck supported by a number of length-adjustable legs connected with said deck in first pivot points, said legs being connected with a baseplate in second pivot points, wherein the baseplate is supported by a number of swiveling arms connected to said baseplate in third pivot points, said swiveling arms being movably connected with a ground plate in a number of fourth pivot points, wherein said fourth pivot points are positioned above said third pivot points when the distance between the deck and the ground is minimal, and wherein said deck has at least five degrees of freedom relative to said baseplate.

2. A motion simulator according to claim 1, wherein the baseplate is connected with the ground plate in such a manner that the baseplate during use has a virtual center of motion located near, preferably inside, a simulator part formed or supported by the deck.

3. A motion simulator according to claim 1, wherein at least one of the swivelling arms has a length differing from the length of at least one of the other swivelling arms, each of the lengths being measured between the relevant third and fourth pivot points.

4. A motion simulator according to claim 1, wherein the longitudinal axes of the swivelling arms intersect or cross each other, at least in pairs, near, preferably in, the center of motion, which center of motion is preferably formed by a virtual axis of swing.

5. A motion simulator according to claims 1, wherein at least two pairs of swivelling arms are provided, wherein the third pivot points of a first and a second pair of swivelling arms, respectively, define a primary and a secondary first swivel axis, respectively, which first swivel axes are substantially parallel to each other, while the fourth pivot points of the first and the second pair of swivelling arms, respectively, define a primary and a secondary second swivel axis, respectively, which second swivel axes are substantially parallel to the first swivel axes.

6. A motion simulator according to claim 1, wherein the second pivot points, viewed in side elevation, are located below the upper ends of the swivelling arms.

7. A motion simulator according to claim 1, comprising at least six legs.

8. A motion simulator according to claim 1, wherein the deck at least partly extends in between the legs.

9. A motion simulator according to claim 1, wherein three swiveling arms are provided, the third pivot points of at least one swivel arm being located between two second pivot points.

10. A motion simulator comprising a deck supported by at least six length-adjustable legs connected with said deck in first pivot points, said legs being connected with a baseplate in second pivot points, wherein the baseplate is movably connected with a ground plate, and wherein the deck is movable relative to the baseplate in at least five degrees of freedom.

11. A motion simulator comprising a deck supported by a number of length-adjustable legs connected with said deck in first pivot points, said legs being connected with a baseplate in second pivot points, wherein the baseplate is movably connected, via three swivel arms, with a ground plate, and wherein a third pivot point of at least one swivel arm is located between two second pivot points.

12. A motion simulator comprising a deck supported by a number of length-adjustable legs connected with said deck in first pivot points, said legs being connected with a baseplate in second pivot points, wherein the baseplate is movably connected with a ground plate, wherein the baseplate is supported by a number of swivelling arms connected with said baseplate in third pivot points, said swivelling arms being connected with the ground plate in a number of fourth pivot points, and wherein at least one of the swivelling arms has a length differing from the length of at least one of the other swivelling arms, each of the lengths being measured between associated third and fourth pivot points.

13. A motion simulator comprising a deck supported by a number of length-adjustable legs connected with said deck in first pivot points, said legs being connected with a baseplate in second pivot points, wherein the baseplate is movably connected with a ground plate, wherein the baseplate is supported by a number of swivelling arms connected with said baseplate in third pivot points, said swivelling arms being connected with the ground plate in a number of fourth pivot points, and wherein the longitudinal axes of the swivelling arms intersect or cross each other, at least in pairs, near, preferably in, the center of motion, which center of motion is preferably formed by a virtual axis of swing.

14. A motion simulator comprising a deck supported by a number of length-adjustable legs connected with said deck in first pivot points, said legs being connected with a baseplate in second pivot points, wherein the baseplate is movably connected with a ground plate, wherein the baseplate is supported by a number of swivelling arms connected with said baseplate in third pivot points, said swivelling arms being connected with the ground plate in a number of fourth pivot points, wherein at least two pairs of swivelling arms are provided, and wherein the third pivot points of a first and a second pair of swivelling arms, respectively, define a primary and a secondary first swivel axis, respectively, which first swivel axes are substantially parallel to each other, while the fourth pivot points of the first and the second pair of swivelling arms, respectively, define a primary and a secondary second swivel axis, respectively, which second swivel axes are substantially parallel to the first swivel axes.

15. A motion simulator comprising a deck supported by a number of length-adjustable legs connected with said deck in first pivot points, said legs being connected with a baseplate in second pivot points, wherein the baseplate is movably connected with a ground plate, wherein the baseplate is supported by a number of swivelling arms connected with said baseplate in third pivot points, said swivelling arms being connected with the ground plate in a number of fourth pivot points, and wherein the second pivot points, viewed in side elevation, are located below upper ends of the swivelling arms.

\* \* \* \* \*